(12) United States Patent  
Hansson

(10) Patent No.: US 7,930,367 B2  
(45) Date of Patent: Apr. 19, 2011

(54) LOW STORAGE PORTABLE MEDIA PLAYER

(75) Inventor: Magnus F. Hansson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 505 days.

(21) Appl. No.: 11/324,264

(22) Filed: Jan. 4, 2006

(65) Prior Publication Data

US 2007/0168540 A1     Jul. 19, 2007

(51) Int. Cl.
G06F 15/16     (2006.01)

(52) U.S. Cl. .......................... 709/219; 709/231; 709/234

(58) Field of Classification Search .................. 709/219, 709/231, 234
See application file for complete search history.

(56) References Cited

U.S. PATENT DOCUMENTS

| | | | |
|---|---|---|---|
| 6,339,785 B1 * | 1/2002 | Feigenbaum | 709/213 |
| 6,587,127 B1 * | 7/2003 | Leeke et al. | 715/765 |
| 6,694,200 B1 * | 2/2004 | Naim | 700/94 |
| 7,043,473 B1 * | 5/2006 | Rassool et al. | 1/1 |
| 7,680,824 B2 * | 3/2010 | Plastina et al. | 705/27 |
| 2002/0146237 A1 * | 10/2002 | Safadi | 386/94 |
| 2002/0194309 A1 | 12/2002 | Carter et al. | |
| 2003/0097379 A1 * | 5/2003 | Ireton | 707/200 |
| 2004/0230672 A1 * | 11/2004 | Zuckerberg et al. | 709/222 |
| 2005/0216855 A1 * | 9/2005 | Kopra et al. | 715/767 |
| 2005/0251566 A1 * | 11/2005 | Weel | 709/219 |
| 2006/0195902 A1 * | 8/2006 | King et al. | 726/21 |
| 2006/0224943 A1 * | 10/2006 | Snyder et al. | 715/501.1 |
| 2006/0235798 A1 * | 10/2006 | Alkove et al. | 705/59 |
| 2006/0276230 A1 * | 12/2006 | McConnell | 455/563 |
| 2007/0050458 A1 * | 3/2007 | Rotzoll et al. | 709/206 |
| 2007/0162502 A1 * | 7/2007 | Thomas et al. | 707/104.1 |
| 2007/0174471 A1 * | 7/2007 | Van Rossum | 709/229 |

FOREIGN PATENT DOCUMENTS

| | | |
|---|---|---|
| CN | 1452095 A | 10/2003 |
| WO | 2004/008460 | 1/2004 |

OTHER PUBLICATIONS

International Search Report, Nov. 28, 2006, 4 pages.

* cited by examiner

*Primary Examiner* — Rupal D Dharia
*Assistant Examiner* — Van Kim T Nguyen
(74) *Attorney, Agent, or Firm* — Harrity & Harrity, LLP

(57) ABSTRACT

A portable media player can play a large number of media files without being required to physically store all of the media files at any given time. In one implementation, the portable media player includes a memory to store a playlist that includes a plurality of entries succinctly representing media files and a media access manager component. The media access manager component receives media files referenced by entries in the playlist over one or more of a plurality of network connections. The media access manager component downloads the media files as they become available over the network connections based on policies preset on the portable media player and policies preset for the media files.

21 Claims, 4 Drawing Sheets

LOW STORAGE PORTABLE MEDIA PLAYER

BACKGROUND

A. Technical Field of the Invention

Implementations described herein relate generally to portable media playback devices, and more particularly, to receiving media in a network environment.

B. Description of Related Art

Portable media players typically include a hard disk or flash memory on which they store files in one or more media formats. For example, an MP3 portable music player generally refers to a device designed to store music files encoded in the mp3 format. A user of the MP3 player may update files that are on the MP3 player by connecting the player to a personal computer and downloading the music files to the MP3 player.

Portable media players are typically designed to play music files and/or video files. A portable media player may be a device designed exclusively as a media player or as a more general device, such as a mobile phone that includes the ability to play media files.

Existing portable media players are frequently limited by both the storage capacity (e.g., the size of the hard disk or flash memory) of the portable media player and by the limited interfaces through which the portable media player is designed to download/synchronize media files. Many conventional portable media players are, for example, limited to receiving new media files when they are directly connected to a personal computer.

SUMMARY

According to one aspect, a portable media player includes a memory to store a playlist that includes a plurality of entries identifying media files and a media access manager component. The media access manager component receives media files referenced by entries in the playlist over one or more of a plurality of network connections. The media access manager component downloads the media files over the network connections based on policies set on the portable media player and policies set for the media files.

Additionally, the portable media player may further includes a storage component configured to store the downloaded media files, the storage component including less storage than a total storage of all the media files that are identified by the entries in the playlist.

Additionally, the portable media player may include a network connectivity component configured to connect to other devices via the plurality of network connections.

Additionally, the media access manager component of the portable media player may download the media files as they become available over the network on an as-needed basis.

Additionally, the policies are preset on the portable media player and may include policies relating to minimum quality settings for the media files, account information settings relating to a user, or payment settings.

Additionally, the media files may include one of music files, video files, or files relating to streaming audio or video.

Additionally, the plurality of network connections may comprise at least two of traditional wired network portions, WiFi network connections, broadband wireless networks, Bluetooth connections, or mobile telephone network connections.

Additionally, the media access manager component may be additionally configured to upload media files to other portable media players.

Additionally, each of the entries in the playlist further may include a media identification (ID) field that acts as a fingerprint for a corresponding media file and a user preference field to store the policies set on the portable media player.

Another aspect is directed to a device comprising a network connectivity component configured to be capable of wirelessly connecting to a plurality of network connections and a media access manager component coupled to the network connectivity component and configured to manage downloading of desired media files over the plurality of network connections as the media files become available via one of the plurality of network connections.

Additionally, the device may further include a memory to store a playlist that includes a plurality of entries identifying the desired media files.

Additionally, the playlist may be configurable by a user of the device.

Additionally, the device may further include a storage component configured to store the downloaded media files, the storage component including less storage than a total storage of all the media files that are identified by the playlist.

Additionally, the media access manager component may download the media files in accordance with policies that include policies relating to minimum quality settings for the media files, account information settings relating to a user, or payment settings of the user.

Another aspect is directed to a method that includes scanning for the availability of at least one potential network connection and determining whether a desired media file is available via an available network connection and whether policies associated with the desired media file are consistent with download of the desired media file. Further, the method includes downloading the media file based on the determined availability of the desired media file and the policies.

Additionally, the media files are downloaded in the method as they become available over the network on an as-needed basis of a user.

According to another aspect, a device includes means for scanning for the availability of a plurality of potential network connections and means for determining whether a desired media file is available on an available network connection and whether policies associated with the desired media file are consistent with download of the desired media file. The device further includes means for downloading the media file based on the determined availability of the desired media file and the policies

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

A portable media player is described herein that can play a large number of media files without being required to physically store all of the media files at any given time. A given media file or stream may be dynamically accessed over a number of possible network connections. Media files to be accessed may be selected adaptively based on a combination of factors such as, for example, quality of the network connection, user settings, availability of the media file, and digital rights management (DRM) issues. Ideally, the user may have access to an extremely large media library while only having to store a small portion of the complete library at any given time.

EXEMPLARY SYSTEM OVERVIEW

Figure 1:
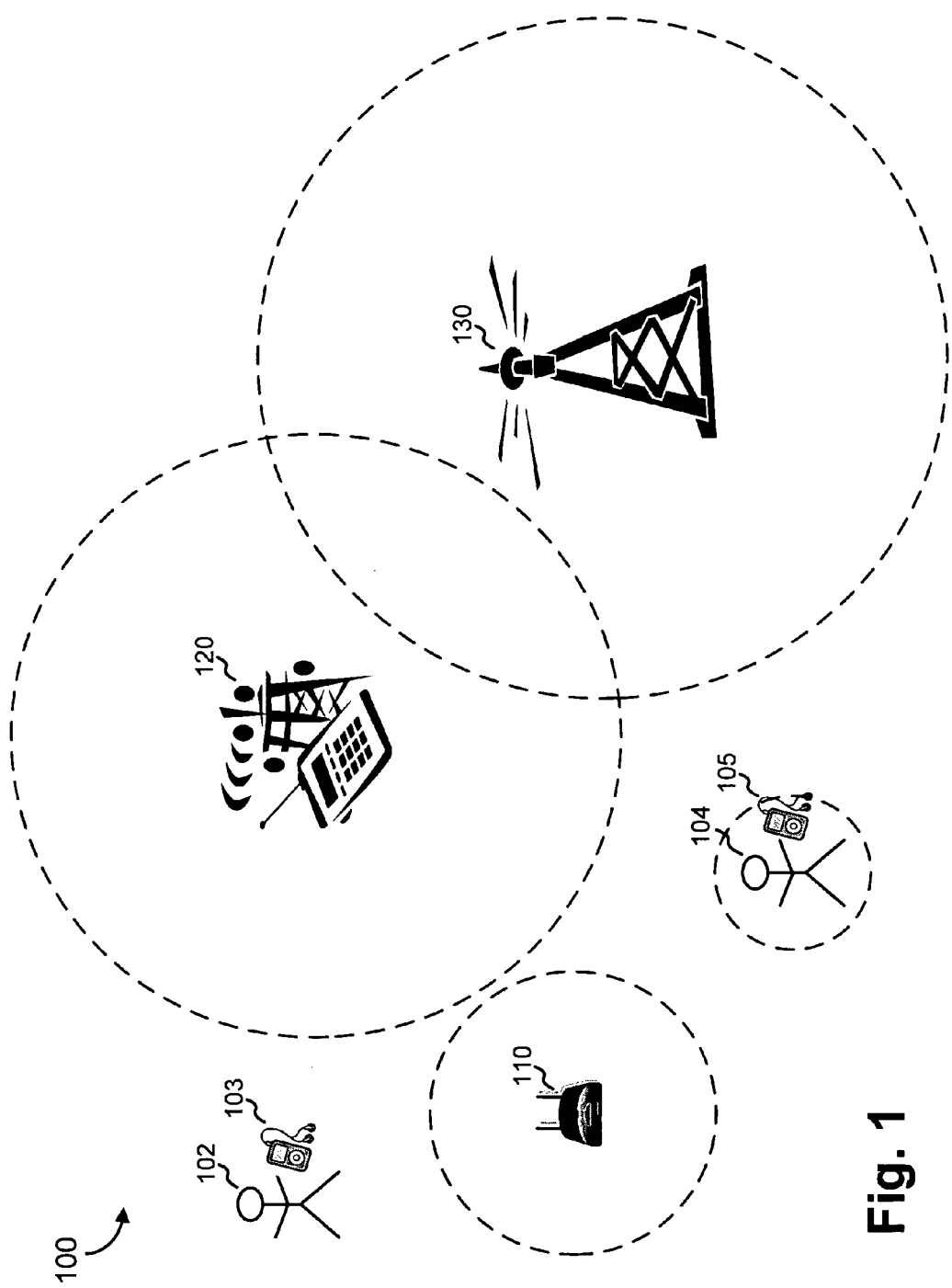
FIG. 1 is an exemplary diagram of a system in which concepts consistent with the principles of the invention may be implemented.

FIG. 1 is an exemplary diagram of a system 100 in which concepts consistent with the principles of the invention may be implemented. System 100 may include a number of different wired or wireless networks that may or may not overlap with one another. The networks may include, for example, traditional wired network portions, WiFi (i.e., IEEE 802.11) network connections, broadband wireless networks, Bluetooth connections, cellular networks, etc. As is particularly illustrated in FIG. 1, system 100 may include a WiFi access point 110, a mobile telephone network antenna 120, and a broadband wireless network antenna 130. Each of access point 110 and antennas 120 and 130 may be associated with a corresponding network range, indicated in FIG. 1 by dashed circle surrounding 110, 120, and 130.

Mobile users 102 and 104 are also illustrated in FIG. 1. Mobile users 102 and 104 may carry portable media players 103 and 105, respectively. Players 103 and 105 may be dedicated portable media players or may be portable media players that can perform other functions, such as a device that can function as both a mobile telephone (also referred to as a mobile terminal) and a portable media player.

Portable media players 103 and 105, or other devices carried by users 102 and 104, may themselves be capable of networking with nearby devices. Portable media player 105, for example, may include local wireless connectivity, such as Bluetooth connectivity. Bluetooth is a known standard for wireless personal area networks (PANs).

Users 102 and 104 may move within system 100 in a manner that may, at different times, take them in and out of connectivity of the various network connections shown in FIG. 1.

Figure 2:
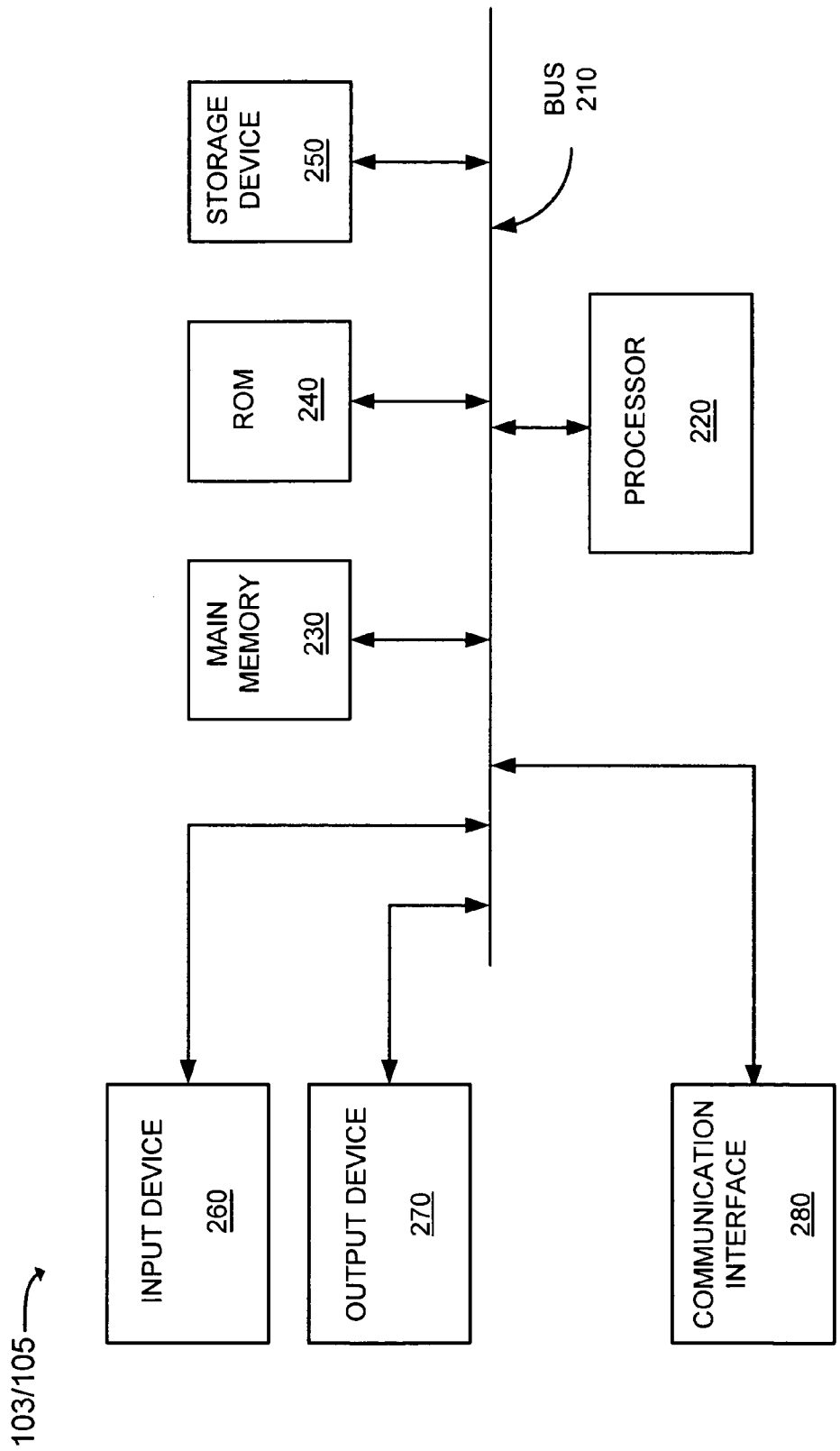
FIG. 2 is an exemplary diagram of a computing device, such as one of the portable media players shown in FIG. 1.

FIG. 2 is an exemplary diagram of a portable media player 103/105, such as one of portable media players 103 and 105. Computing device 200 may include a bus 210, a processor 220, a main memory 230, a read only memory (ROM) 240, a storage device 250, an input device 260, an output device 270, and a communication interface 280. Bus 210 may include a path that permits communication among the components of computing device 200.

Processor 220 may include any type of conventional processor, microprocessor, or processing logic that may interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may provide for non-volatile rewritable storage. For example, storage device 250 may include a magnetic recording medium, such as a hard disk drive, or non-volatile semiconductor storage, such as a Flash memory device.

Input device 260 may include a conventional mechanisms that permits a user to input information to portable media player 103/105. Input device may include, for example, keys, dials, switches, etc., on the face of portable media player 103/105 that permit the user to enter information. Input device may additionally include an interface to other known input devices, such as a keyboard, a mouse, a pen, voice recognition and/or biometric mechanisms, etc. Output device 270 may include a conventional mechanism that outputs information to the user, including a display, a speaker, etc.

Communication interface 280 may include any transceiver-like mechanism that enables portable media player 103/105 to communicate with other devices and/or systems. For example, communication interface 280 may include mechanisms for communicating with another device or system. Communication interface 280 may include, for example, an antenna or multiple antennas for connecting to one or more of the network connections shown in FIG. 1, such as a mobile telephone network, a Bluetooth connection, a WiFi connection, and/or a broadband wireless LAN network.

Portable Media Player 103/105

Figure 3:
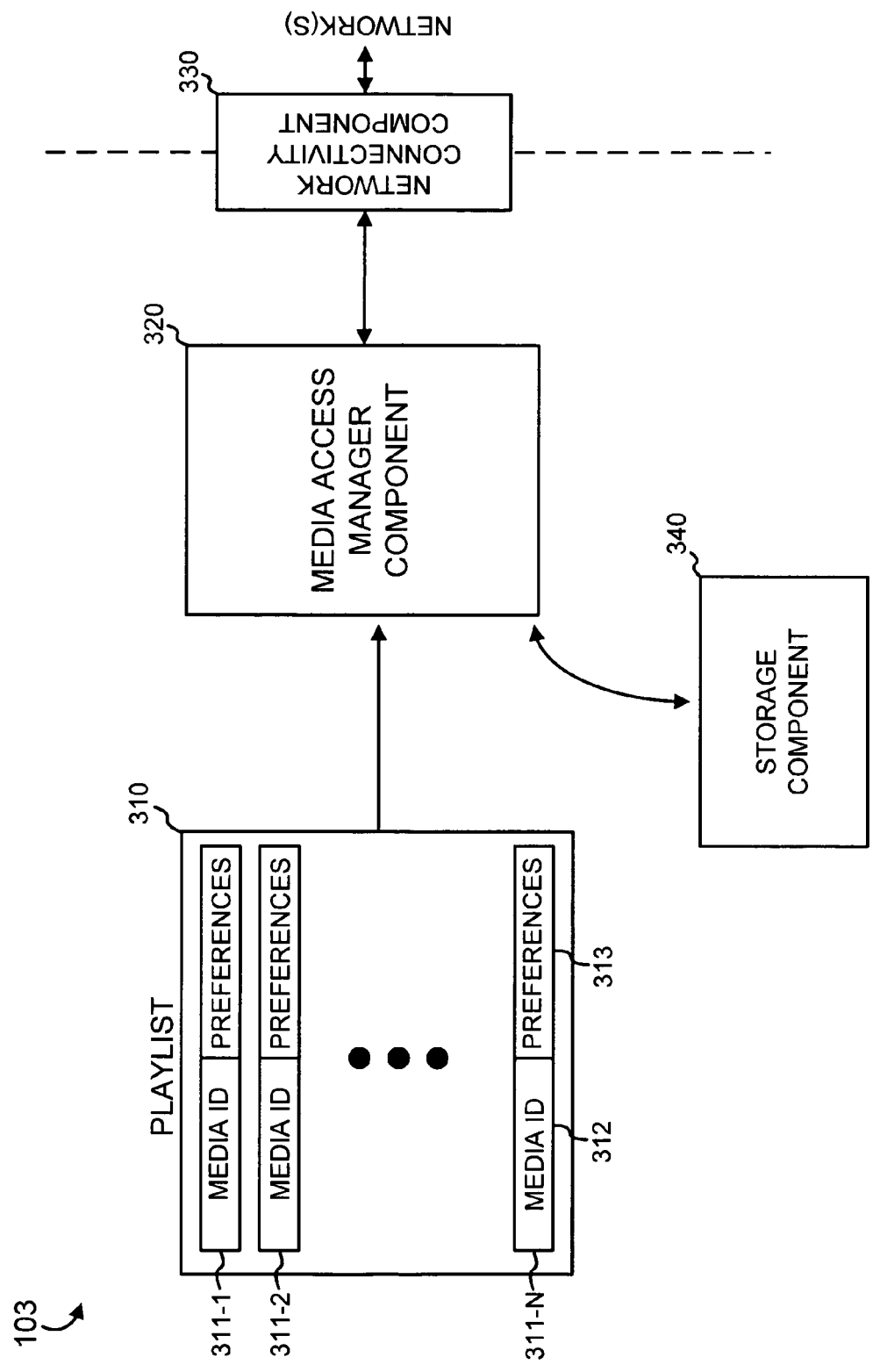
FIG. 3 is a diagram conceptually illustrating components of the portable media player shown in FIG. 1.

FIG. 3 is a diagram conceptually illustrating components of a portable media player, such as portable media player 103 or 105, consistent with aspects of the invention. For ease of explanation, the portable media player shown in FIG. 3 will be referred to as portable media player 103 herein.

Portable media player 103 may include a playlist 310, a media access manager component 320, a network connectivity component 330, and a storage component 340. Playlist 310 may include a data structure stored in computer readable memory. The elements illustrated in FIG. 3 may be implemented, for example, by processor 220 executing instructions in memory 230 and/or other devices illustrated in FIG. 2.

Playlist 310 may include one or more media entries 311-1 through 311-N (collectively media entries 311). Each media entry 311 may represent content, such as a song or other music event, or a video broadcast. In some implementations, a media entry 311 may even represent written content such as a book. Media entries 311 may generally be thought of as links to the content, but not the content itself. In one implementation, each media entry 311 may be of significantly smaller size than a file of the actual content.

More specifically, each media entry 311 may include a media identification (ID) field 312 and a user preferences field 313. Media ID field 312 may identify the content. Media ID field 312, may be, for example, a fixed length hash value that can serve as a fingerprint or identifier that represents the content. Other techniques for generating fingerprints that represent content are known in the art and can be used. For example, the International Standard Recording Code (ISRC) is an international identification system for sound recordings and music video recordings. Each ISRC is a unique identifier for a specific recording which can act as its digital fingerprint.

User preference fields 313 may include user specific policy information relating to the content. For example, the user may specify minimum quality settings for the content, account information settings, payment settings, digital rights management (DRM) settings, etc. As is known in the art, DRM generally refers to any of several technical methods used to handle the description, layering, analysis, valuation, trading and monitoring of the rights held over a digital work. In general, user preference fields 313 may be used to store any device specific or user specific information. Additionally, although a single preference field 313 is shown for each media ID field 312, one of ordinary skill in the art will recognize that user or device specific information in preferences field 313 may also be global information and may thus be stored once and applied to multiple ones or all of media entries 311.

Media entries 311 in playlist 310 may be managed by user 102 of portable media player 103. The user may, for instance, add or delete media entries in playlist 310 either directly through portable media player 103 or by downloading media entries from a personal computer or other computing device.

Media access manager component 320 may generally provide for intelligent downloading and playback of content based on available network connections and based on the content the user is interested in, as indicated by playlist 310. Which content to download at any given time may be intelligently selected by media access manager component 320 based on a number of factors, such as the network connection(s) currently available, the media IDs 312, and the policies defined by preference fields 313. Other factors, such as, for songs, the past listening habit of the user and the order of the songs in playlist 310 (e.g., the next song in the playlist) may also be used to determine which content to download at a given time.

Network connectivity component 330 may include logic to handle the physical network connections. Network connectivity component 330 may, for example, include communication interface 280. Network connectivity component 330 may include different logic for different types of network connections. Network connectivity component 330 may include, for instance, circuitry for enabling Bluetooth connections, circuitry for enabling WiFi connections, circuitry for connecting to a mobile telephone network, and/or circuitry for connecting to a broadband wireless network. Network connectivity component 330 may additionally include antenna(s) required for each of these connections.

Storage component 340 may be used to store content downloaded by media access manager component 320. Storage component 340 may include, for example, a hard disk drive, Flash memory, or random access memory. Storage component 340 may be used as a temporary cache for downloaded content or as a more permanent memory for storing content. Whether downloaded content is stored temporarily or whether it is stored as a "permanent" file that is made available to the user may depend on factors such as user preferences and DRM information associated with the content.

Figure 4:
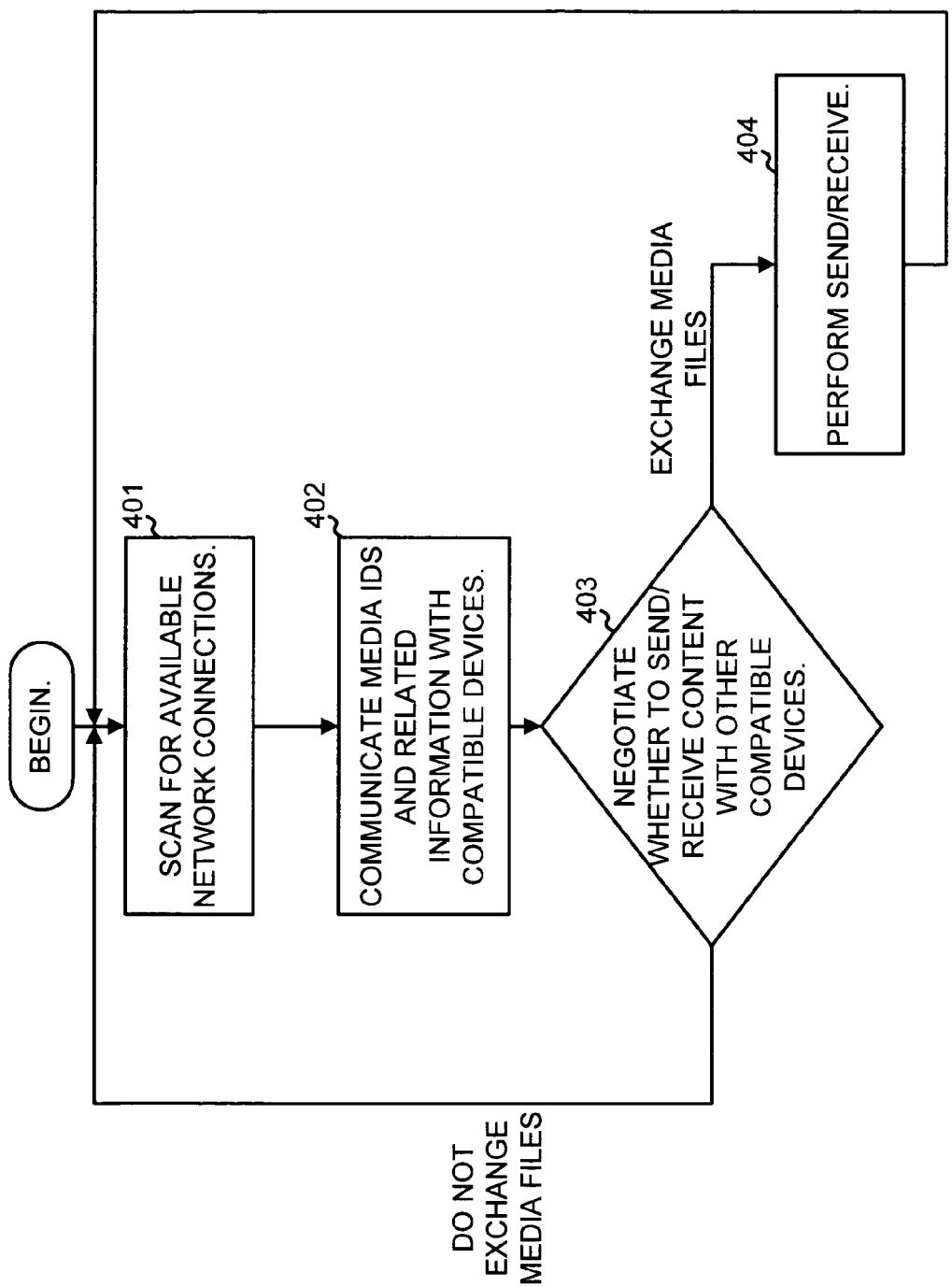
FIG. 4 is a flow chart illustrating exemplary operations of the portable media player shown in FIG. 1.

FIG. 4 is a flow chart illustrating exemplary operations of portable media player 103. Assume that user 102 has turned portable media player 103 on and has enabled the downloading or uploading of content.

Network connectivity component 330 may scan for available network connections (act 401). As illustrated in FIG. 1, and described previously, and described previously, available network connections may include, for example, WiFi network connections, broadband wireless networks, Bluetooth connections, cellular networks, and even traditional wired (e.g., Ethernet) connections. Network connections may move in an out of connectivity as the user moves about. Network connectivity component 330 may keep an up-to-date list of available network connections and may inform media access manager component 320 of changes to available network connections.

For the available networks, media access manager component 320 may communicate with compatible devices that are configured to send or receive content. More specifically, media access manager component 320 may receive media IDs 312 and other related information from other devices, such as network servers and/or other portable media devices, that are designed to transmit content (act 402). The related information may include, for example, DRM information associated with the content, file size, bandwidth requirements, or whether the content is a streaming media file. In some implementations, portable media player 103 may itself be configured to send content to other connected devices, and in these situations, media access manager component 320 may broadcast media IDs 312 and other related information (such as DRM information) to these other devices (act 402).

Media access manager component 320 may determine whether to initiate downloading of content based on whether other compatible devices contain desired media, as determined by entries 311 (act 403). Similarly, media access manager component 320 may make decisions on whether to initiate uploading of content based on whether the other devices desire media files stored in storage component 340, as determined using media IDs 312 and entries 311 (act 403). Other factors, such as information in preferences field 313 may also be considered in determining whether to initiate downloading or uploading content. For example, the content may require payment from the user before it can be downloaded. The payment information may be included in the information received with the media ID in act 402. If the content requires payment that is acceptable to the user, as may be indicated by preferences field 313, media access manager component 320 may determine to download the content. In general, any number of downloading or uploading rules or policies can be implemented in this manner by comparing the information in preferences field 313 with information received from other devices.

If media files are approved for exchange in act 403, the media files may then be exchanged (act 404).

In some implementations, only a portion of a content file may be downloaded while the portable media player 103 is in connection with an available network. In this situation, storage component 340 may store the downloaded portion. The remainder of the content file may then be downloaded next time the portable media player connects with a network capable of supplying the remaining portion of the file.

In some implementations, portable media player may allow the user begin to listen to or view a content file before it has completely downloaded. In other implementations, the content file may be a streaming media file that is designed to be listened to in a streaming manner.

As an example of the above-described operation of portable media player 103, consider a user 102 walking or driving through a neighborhood with portable media player 103. The user may have preconfigured playlist 310 with a number of songs, videos, streaming music channels, Podcasts, or other media offerings. The user may variously move in and out of network connectivity. As described above, portable media player 103 may dynamically and intelligently download media based on an adaptive combination of user desirability and availability.

In some implementations, the user's portable media player may also upload content to other users. Assume, for example, that a first user comes into network contact, such as over a Bluetooth connection, with a second user. The second user may desire a Podcast that the first user has stored. The second user may download the Podcast directly from the first user over the Bluetooth connection.

CONCLUSION

Implementations consistent with principles of the invention relate to a portable media players that may dynamically access media on an as-needed basis over available network connections. This may allow the user to create playlists without the restriction of having the media stored on the device.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 4, the order of the acts may be modified in other implementations consistent with the principles of the invention. Further, non-dependent acts may be performed in parallel.

The term "mobile telephone" or "mobile terminal," as used herein, may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. The portable media player described herein may be implemented within a mobile terminal.

It should be emphasized that the term "comprises" or "comprising" when used in the specification is taken to specify the presence of stated features, integers, steps, or components but does not preclude the presence or addition of one or more other features, integers, steps, components, or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A portable media player comprising:
   a memory to store a playlist that includes a plurality of entries, each entry comprising:
      a media file identifier, and
      a user preferences field to store information specifying one or more policies associated with obtaining content of a media file identified by the media file identifier; and
   a media access manager component to:
      transmit the media file identifier to one or more devices over one or more of a plurality of networks,
      receive a media file identifier and information specifying one or more policies relating to obtaining content of a media file associated with the received media file identifier,
      determine that the stored information, specifying one or more policies associated with obtaining the content of the media file associated with the received media file identifier, is consistent with the received information,
      download, in response to the determination, a first portion of the media file associated with the received media file identifier when the portable media player connects to the one or more devices, over the one or more of the plurality of networks, where the first portion of the media file is less than the entire media file, and
      download, in response to the determination, a second portion of the media file associated with the received media file identifier when the portable media player, after downloading the first portion, next connects to the one or more devices, over the one or more of the plurality of networks, where the second portion of the media file is less than the entire media file and different than the first portion.

2. The portable media player of claim 1, further comprising:
   a storage component to store downloaded media files, the storage component including less storage than a total storage of all the media files that are capable of being represented by the entries in the playlist.

3. The portable media player of claim 2, further comprising:
   a network connectivity component to connect to other devices via a plurality of network connections.

4. The portable media player of claim 1, where the media access manager component downloads the media files on an as-needed basis of a user.

5. The portable media player of claim 1, where the one or more stored policies are preset on the portable media player and include policies relating to minimum quality settings for the media files or account information settings relating to a user.

6. The portable media player of claim 1, where the media files include one of audio files, video files, or files relating to streaming audio or video.

7. The portable media player of claim 3, where the plurality of network connections include at least two of traditional wired network connections, WiFi network connections, broadband wireless connections, Bluetooth connections, or mobile telephone network connections.

8. The portable media player of claim 1, where the media access manager component is additionally to upload media files to other portable media players.

9. A device comprising:
   a memory to store a playlist that includes a plurality of entries identifying desired media files and to store information specifying one or more policies associated with obtaining content of each desired media file from at least one network device, where the one or more policies include one or more of:
      minimum quality settings for the content,
      account information settings associated with a user,
      payment settings associated with the user, or
      digital rights management (DRM) settings associated with the content; and
   a network connectivity component to:
      establish at least one network connection,
      transmit, via the at least one network connection, the plurality of entries identifying the desired media files and identifying the one or more policies, associated with obtaining the content of each of the desired media files, and receive, via the at least one network connection, information specifying one or more policies relating to obtaining content of the desired media files; and a media access manager component, coupled to the network connectivity component, to:
compare the stored information specifying one or more policies associated with obtaining content of each desired media file with the received information,
download, based on the comparison, a first portion of one of the desired media files when the portable media player connects to the at least one network device, over the at least one network connection, where the first portion of the one of the desired media files is less than an entirety of the one of the desired media files, and
download, based on the comparison, a second portion of the one of the desired media files when the portable media player, after downloading the first portion, next connects to the at least one network device, over the at least one network connection, where the second portion of the one of the media files is less than the entirety of the one of the desired media files and different than the first portion.

10. The device of claim 9, where the playlist is configurable by a user of the device.

11. The device of claim 9, further comprising:
a storage component to store the downloaded media files, the storage component including less storage than a total storage of all the media files that are identified by the playlist.

12. The device of claim 9, where the media access manager component downloads the media files as the media files become available over the at least one network connection on an as-needed basis of the user.

13. The device of claim 9, where the media files include one of audio files, video files, or files relating to streaming audio or video.

14. The device of claim 9, where the network connection includes at least one of a wired network connection, a WiFi network connection, a broadband wireless connection, a Bluetooth connection, or a mobile telephone network connection.

15. The device of claim 9, where the media access manager component is additionally to upload media files to devices connected via one of the network connection.

16. A method performed by a portable media player, the method comprising:
storing, in a memory of the portable media player, a list of media files and storing information specifying one or more policies associated with obtaining content of each media file;
scanning, by a processor of the portable media player, for availability of at least one potential network connection;
determining, by the processor, whether a desired media file, stored on another device, is available via an available network connection, of the at least one potential network connection, and whether the stored information, specifying one or more policies associated with obtaining content of the desired media file, is consistent with information, specifying one or more policies associated with obtaining the content of the desired media file, stored on the other device;
downloading, by a communication interface of the portable media player, and based on the determined availability of the desired media file and the one or more stored policies, a first portion of the desired media file when the portable media player connects to the other device, where the first portion of the media file is less than the entire media file, and
downloading, by the communication interface of the portable media player, and based on the determined availability of the desired media file and the one or more stored policies, a second portion of the desired media file when the portable media player, after downloading the first portion, next connects to the other device, where the second portion of the media file is less than the entire media file and different than the first portion.

17. The method of claim 16, where the media files are downloaded on an as-needed basis of a user.

18. The method of claim 16, where the one or more stored policies includes policies relating to minimum quality settings for the media files, account information settings relating to a user, payment settings of the user, or digital rights management (DRM) information.

19. The method of claim 16, where the media file includes one of an audio music file, a video file, or a file relating to streaming audio or video.

20. The method of claim 16, where the at least one potential network connection comprises a wired network connection, a WiFi network connection, a broadband wireless connection, a Bluetooth connection, or a mobile telephone network connection.

21. A device comprising:
means for storing a list of media files and storing information specifying one or more policies associated with obtaining content of each media file;
means for scanning for availability of a plurality of potential network connections;
means for determining whether a desired media file, stored on a second device, is available on an available network connection, of the plurality of potential network connections, and whether the stored information, specifying one or more policies associated with obtaining content of the desired media file, is consistent with information, specifying one or more policies associated with obtaining the content of the desired media file, stored on the second device;
means for downloading, based on the information specifying the one or more stored policies that are stored on the device matching the information specifying the one or more stored policies that are stored on the second device, a first portion of the desired media file when the device connects to the second device, where the first portion of the media file is less than the entire media file, and
means for downloading, based on the information specifying the one or more stored policies that are stored on the device matching the information specifying the one or more stored policies that are stored on the second device, a second portion of the desired media file when the device, after downloading the first portion, next connects to the second device, where the second portion of the media file is less than the entire media file and different than the first portion.

* * * * *